US012711271B2

(12) United States Patent
Khan et al.

(10) Patent No.: US 12,711,271 B2
(45) Date of Patent: Aug. 18, 2026

(54) SYSTEM AND METHOD FOR OBJECTIVE QUANTIFICATION AND MITIGATION OF PRIVACY RISK

(71) Applicant: Truata Limited, Dublin (IE)

(72) Inventors: Imran Khan, Dublin (IE); Michael Fenton, Greystones (IE); Maurice Coyle, Dublin (IE); Noel Rogers, Dublin (IE)

(73) Assignee: TRUATA LIMITED, Sandyford (IE)

( * ) Notice: Subject to any disclaimer, the term of this patent is extended or adjusted under 35 U.S.C. 154(b) by 0 days.

(21) Appl. No.: 18/623,172

(22) Filed: Apr. 1, 2024

(65) Prior Publication Data

US 2024/0241990 A1 Jul. 18, 2024

Related U.S. Application Data

(63) Continuation-in-part of application No. 18/372,575, filed on Sep. 25, 2023, now Pat. No. 12,254,115, which is a continuation of application No. 16/813,327, filed on Mar. 9, 2020, now Pat. No. 11,768,958.

(51) Int. Cl.

| | |
|---|---|
| ***G06F 21/62*** | (2013.01) |
| ***G06F 16/16*** | (2019.01) |
| ***G06F 16/22*** | (2019.01) |
| ***G06F 21/57*** | (2013.01) |

(52) U.S. Cl.
CPC ........ *G06F 21/6254* (2013.01); *G06F 16/168* (2019.01); *G06F 16/221* (2019.01); *G06F 21/577* (2013.01)

(58) Field of Classification Search
CPC .. G06F 21/6254; G06F 16/221; G06F 16/168; G06F 21/577
See application file for complete search history.

(56) References Cited

U.S. PATENT DOCUMENTS

| | | | | |
|---|---|---|---|---|
| 10,803,201 | B1 | 10/2020 | Nicholls et al. | |
| 11,216,895 | B1 | 1/2022 | Schwartz et al. | |
| 11,232,383 | B1 | 1/2022 | Burns, Sr. et al. | |
| 11,341,447 | B2 * | 5/2022 | Brannon | G06F 21/552 |
| 11,645,730 | B2 * | 5/2023 | Bennati | G06Q 50/265 726/26 |
| 12,443,750 | B2 * | 10/2025 | Burns | G06F 21/6254 |

(Continued)

*Primary Examiner* — Stephen T Gundry
(74) *Attorney, Agent, or Firm* — Pillsbury Winthrop Shaw Pittman LLP

(57) ABSTRACT

A system and method for estimating privacy risk measures are described. The system and method include an input-output (IO) interface for receiving at least one input dataset, on at least one of which a measurement of the risk is to be performed, and a configuration file governing the specifications of the dataset(s), risk scoring and risk mitigation settings, a processor for determining the size of at least one dataset, based on the size of at least one dataset being larger than a threshold, a sampling engine for estimating the privacy risk by computing a statistically representative sample size and subsampling at least one dataset to a sample size, and a scoring engine to perform column level measurements on the subsampled dataset and row level measurements on at least one dataset. Further included, based on the column level and row level measurements, the IO interface outputs a privacy risk.

20 Claims, 9 Drawing Sheets

(56) References Cited

U.S. PATENT DOCUMENTS 12,445,474 B1 * 10/2025 Reed .................... H04L 67/535
2011/0258206 A1 10/2011 El Emam et al.
2012/0116923 A1 * 5/2012 Irving ................ G06Q 30/0641 707/723
2017/0083719 A1 3/2017 Scaiano et al.
2018/0004978 A1 1/2018 Hebert et al.
2018/0075104 A1 3/2018 Oberbreckling et al.
2018/0114037 A1 4/2018 Scaiano et al.
2019/0266353 A1 8/2019 Gkoulalas-Divanis
2021/0049282 A1 2/2021 Di Valentino et al.
2021/0112101 A1 4/2021 Crabtree et al.
2021/0165913 A1 6/2021 Besanson et al.
2021/0279367 A1 * 9/2021 Khan .................... G06F 21/577
2022/0006840 A1 1/2022 Ng et al.
2022/0012672 A1 1/2022 Inman et al.
2022/0012814 A1 1/2022 Crabtree et al.
2022/0014561 A1 1/2022 Caceres et al.
2022/0030009 A1 1/2022 Hasan
2022/0050921 A1 2/2022 LaFever et al.
2022/0058747 A1 2/2022 Crabtree et al.
2022/0060512 A1 2/2022 Crabtree et al.
2022/0067202 A1 3/2022 Nedelec et al.
2022/0108026 A1 * 4/2022 Ortiz .................. G06F 12/1408
2022/0121731 A1 * 4/2022 Groth .................... G06N 20/20
2022/0121884 A1 * 4/2022 Zadeh .................... G06N 3/006
2022/0126864 A1 * 4/2022 Moustafa .......... B60W 60/0013
2022/0138280 A1 * 5/2022 Riggs ..................... G06Q 40/06 707/737
2022/0166789 A1 * 5/2022 Murray ............... H04L 63/1416
2022/0198779 A1 * 6/2022 Saraee ................ G06F 16/9535
2022/0201042 A1 * 6/2022 Crabtree ............. H04L 63/1425
2022/0210200 A1 * 6/2022 Crabtree ............. H04L 63/1425
2022/0245539 A1 * 8/2022 Clearwater ........ G06Q 10/0635
2024/0111891 A1 * 4/2024 Natili .................. G06F 21/6254
2024/0193481 A1 * 6/2024 Bucklin ................. G06N 20/00
2024/0303360 A1 * 9/2024 Degioanni .......... G06F 21/6218
2025/0294047 A1 * 9/2025 Brown ................ H04L 63/1433
2025/0298921 A1 * 9/2025 Krishnasamy Venugopal ............. G06F 21/6254
2025/0307464 A1 * 10/2025 Phulphagar ......... G06F 21/6254

* cited by examiner

300
Start
301
Input Dataset
305
Input Config. File
310
Apply Recommendations
350
315
Scoring Engine
Contextual Sub-Engine (4)
320
Statistical Sub-Engine (3)
325
Similarity Sub-Engine (2)
330
Uniqueness Sub-Engine (1)
335
Determine Recommendation
345
Failed
Perform Threshold Check
340
True
Passed
Check Config for a Boolean "Apply Recommendations"
347
Export Dataset
355
Export Risk Report
360
False
End
391

SYSTEM AND METHOD FOR OBJECTIVE QUANTIFICATION AND MITIGATION OF PRIVACY RISK

FIELD OF INVENTION

The present invention is directed to a system and method for quantification of privacy-risks in datasets, and more particularly a system and method for objective quantification and mitigation of privacy-risks and a risk-based anonymization recommender system for datasets.

BACKGROUND

Today the world operates on data. This is true in science, business and even sports. Medical, behavioral, and socio-demographic data are all prevalent in today's data-driven research. However, the collection and use of such data raise legitimate privacy concerns. Therefore, companies frequently want to produce anonymized datasets to support the company's internal or external uses cases. Examples of these use cases include load testing, data analytics, driving valuable insights, product development, e-commerce personalization, and vendor selection. Each of these uses may have specific requirements regarding the level of utility included in the resulting dataset. At the same time, the context of the dataset usage affects the privacy characteristics and requirements surrounding the data.

Systematically measuring and quantifying privacy-risk is non-trivial and possibly involves subjectivity. Little attention has been paid to measuring privacy-risk. Any attempts made to measure privacy-risk consider the datasets and ignore the context. This neglects any contextual factors contributing to the privacy-risk, for example whether the data is being released to the public or whether it will be purely used internally. The state-of-the-art lacks approaches that take these contextual factors into account to compute quantitative privacy-risk scores that enable evaluators or regulators to understand the privacy-risks involved in the process of anonymization and subsequently define thresholds to make an informed decision about whether or not to release or use a dataset.

There is an increased awareness of the risks to individuals' privacy through the widespread collection and use of datasets. With this awareness has come a greater focus on being able to quantify and measure the risk of reidentification of an individual from a given dataset.

In the era of big data, many datasets include a significantly higher volume of data, so quantifying privacy risk across an entire dataset often takes longer and leads to larger computational costs. To reduce this compute time and cost, a sample of the dataset may instead be used with privacy risk extrapolated from the sample. However, many popular privacy measures are dependent on the data volume and therefore the reidentification risk scores generated from samples of datasets may not represent the actual reidentification risk inherent in the whole of the dataset. Thus, systems have to make a choice between inaccurate privacy measures or onerous processing time and costs.

SUMMARY

The described system and method provide the ability to quantitatively measure privacy-risks while also considering contextual factors to measure privacy-risks. The system and method produces a privacy-risk score by considering contextual and data-centric aspects of the dataset. The system produces a context-centric privacy-risk score by considering contextual factors and a data-centric privacy-risk score by considering the dataset based on the outputs of a number of metrics engines. The metrics engines measure and quantify privacy-risk by analyzing different aspects of the dataset including, but not limited to, similarity and uniqueness. The context-centric privacy-risk score and data-centric privacy-risk score may be composed to generate a single quantitative privacy-score. Additionally, the system and method provide a risk matrix that lists the scores for data-centric atomic metrics as well as a score for each contextual factor.

A system and method for objective quantification and mitigation of privacy-risk of datasets is disclosed. The system and method include an input-output (IO) interface for receiving at least one input dataset, on at least one of which a measurement of the risk is to be performed, and a configuration file governing the risk quantification and potential mitigation actions, a scoring engine including: a uniqueness sub-engine for determining whether each of the records in the input dataset is unique in a population set at data-subject level, data level, and computing the scores for uniqueness; a similarity sub-engine for comparing two datasets (one original dataset as reference and a transformed version comparison dataset that for instance is a synthesized, anonymized, de-identified, pseudonymized version of the original dataset), calculating similarity between the datasets and producing similarity scores; a statistical sub-engine for computing statistics and distributions over the given input dataset or datasets; and a contextual sub-engine for quantifying contextual factors by considering weighted approaches and producing a single context-centric score; and a recommendation engine identifying mitigation measures to reduce the identified privacy-risks.

A system and method for estimating privacy risk measures are described. The system and method include an input-output (IO) interface for receiving at least one input dataset, on at least one of which a measurement of the risk is to be performed, and a configuration file governing the specifications of the dataset(s), risk scoring and risk mitigation settings, a processor for determining the size of at least one dataset, based on the size of at least one dataset being larger than a threshold, a sampling engine for estimating the privacy risk by computing a statistically representative sample size and subsampling at least one dataset to a sample size, and a scoring engine to perform column level measurements on the subsampled dataset and row level measurements on at least one dataset. The system and method further include, based on the column level and row level measurements, the IO interface outputting a privacy risk. The system and method further include, based on the size of at least one dataset being smaller than a threshold, the scoring engine performing column level measurements on at least one dataset and row level measurements on at least one dataset. The system and method further include a recommendation engine identifying mitigating measures to reduce the privacy-risks by taking into account the factors that are contributing to higher risk. The system and method further include the recommendation engine providing a risk-based recommendation to reduce the privacy-risks in the input dataset. The system and method further include the recommendation engine providing actions to mitigate each privacy-risk identified by the scoring engine. The system and method further include the recommendation engine applying mitigation techniques to the dataset based on the mitigating measures defined in the config file or selected from the list of recommendations made by the recommendation engine. The system and method further include the mitigation techniques including at least one of deletion, multiplication, redaction suppression, and fuzzing, generalization, noise addition, aggregation and masking.

The scoring engine, of the system and method, may include a uniqueness sub-engine for determining whether each of the records in a dataset is unique in its entirety or with regards to subsets of columns that comprise the record, a similarity sub-engine that compares entire records and subsets of columns from at least two input datasets to determine the level of similarity in terms of data reproduction or overlap that exists, a statistical sub-engine that measures statistical characteristics that capture information about input datasets, the captured information used to determine the level of re-identification risk the input datasets contain, and a contextual sub-engine for quantifying contextual factors via weighting and producing a single context-centric score. The system and method further include the uniqueness sub-engine using an optimization step to identify subsets of columns that have high resolving power relative to the data subject. The system and method further include the scoring engine composing the various output scores into a single privacy-risk score. The system and method further include the scoring engine computing at least one privacy-risk score and produces a risk report by accounting for contextual factors and data-centric features in the input dataset. The system and method further include the scoring engine computing scores for at least one of a synthetic dataset, an anonymized dataset, a raw dataset, and a row-level datasets. The system and method further include the IO interface outputting the risk output for at least one input dataset. The system and method further include the system minimizing overt re-identification risks. The system and method further include the re-identification risks including potential risks specified in the configuration file.

BRIEF DESCRIPTION OF THE DRAWINGS

A more detailed understanding can be had from the following description, given by way of example in conjunction with the accompanying drawings wherein.

DETAILED DESCRIPTION

Figure 1:
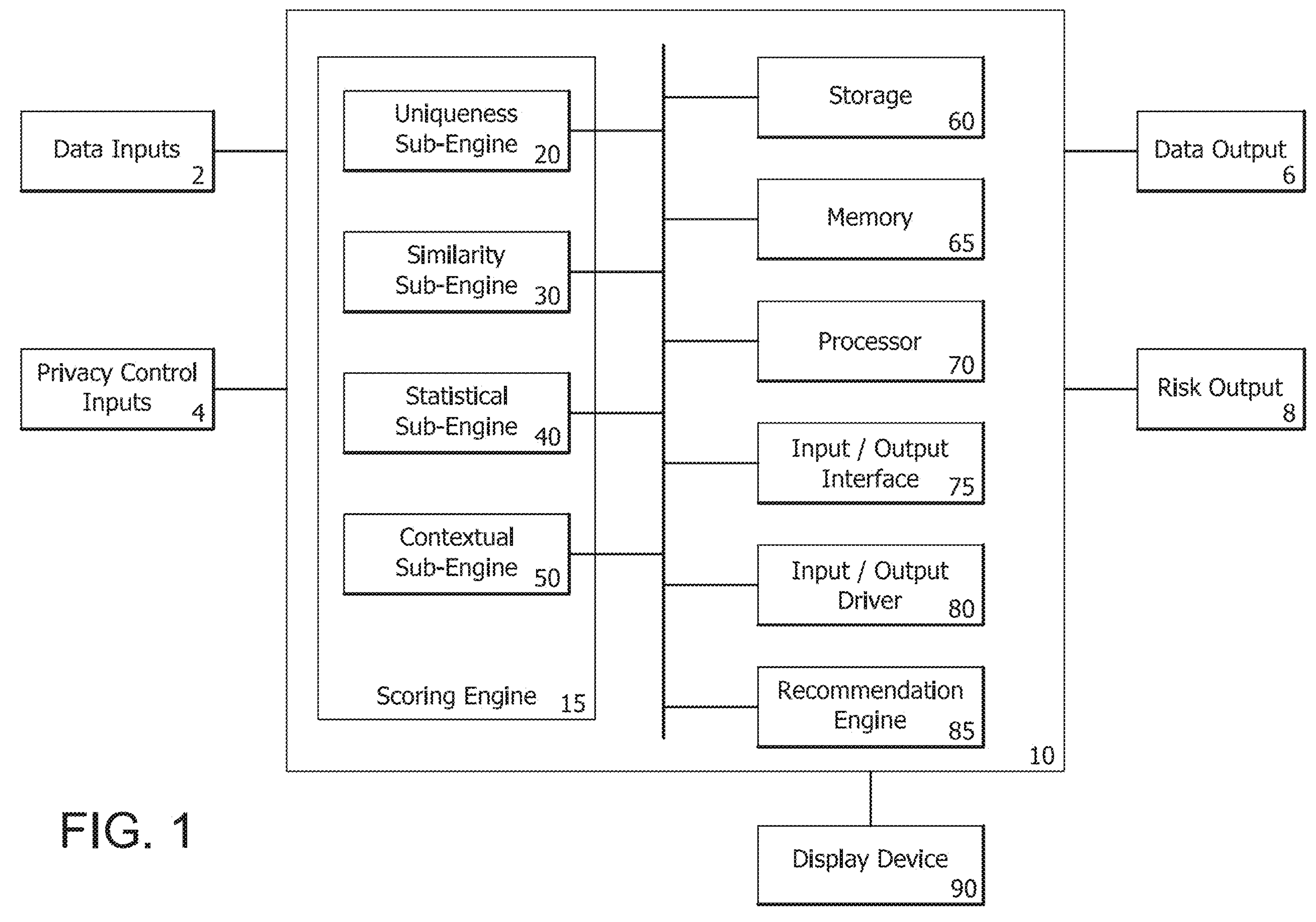
FIG. 1 illustrates a system for objective quantification and mitigation of privacy-risk.

The described system and method provide the ability to quantitatively measure privacy-risk and account for contextual factors to measure privacy-risks and provide a quantified score. The system and method measure a privacy-risk score while taking the contextual features (context-centric privacy-risk score) and the dataset (data-centric privacy-risk score) in to account based on the outputs of a number of metrics. Engines that measure different aspects of the dataset including, but not limited to, similarity and uniqueness metrics. The context-centric privacy-risk score and data-centric privacy-risk score are composed to generate a single quantitative privacy score. Additionally, the system and method provide a risk matrix that lists the scores for data-centric atomic metrics as well as a score for each contextual factor.

Anonymization or de-identification of the dataset may be performed using various methods, including but not limited to, deleting direct personal identifiers in the dataset, replacing identifiers with tokens, perturbing and shuffling the values, generalizing and/or adding noise based on differential privacy methods. In the context of data analysis, re-identification risk is the risk of singling out an individual, the linking of records or matching of data between datasets, or inference of any information about individual or individuals from a dataset.

A system and method for objective quantification and mitigation of privacy-risk of a dataset is disclosed. The system and method include an input-output (IO) interface for receiving at least one input dataset, on at least one of which a measurement of the risk is to be performed, and a configuration file governing the anonymization, a scoring engine including: a uniqueness sub-engine that determines the uniqueness of an individual's records at data subject-level as well as at data-level and also across entire records as well as subsets of columns within the given dataset and outputs uniqueness scores; a similarity sub-engine that compares and computes the similarity between two datasets in terms of data reproduction or overlap that exists between them, by directly comparing entire records as well as the subsets of columns and produces similarity scores; a statistical sub-engine that computes statistics for the given dataset in order to find indications of potential privacy-risks/re-identification risks and to find overt re-identification risks in terms of outliers, including potential risks specified in the configuration file; a contextual sub-engine for quantifying contextual factors by considering weighted approaches and producing a single context-centric score; and a recommendation engine that identifies mitigation measures and techniques to reduce the discovered privacy-risks by taking in to account the factors that are contributing to higher risk.

A system and method for estimating privacy risk measures are described. The system and method include an input-output (IO) interface for receiving at least one input dataset, on at least one of which a measurement of the risk is to be performed, and a configuration file governing the specifications of the dataset(s), risk scoring and risk mitigation settings, a processor for determining the size of at least one dataset, based on the size of at least one dataset being larger than a threshold, a sampling engine for estimating the privacy risk by computing a statistically representative sample size and subsampling at least one dataset to a sample size, and a scoring engine to perform column level measurements on the subsampled dataset and row level measurements on at least one dataset. The system and method further include, based on the column level and row level measurements, the IO interface outputting a privacy risk. The system and method further include, based on the size of at least one dataset being smaller than a threshold, the scoring engine performing column level measurements on at least one dataset and row level measurements on at least one dataset. The system and method further include a recommendation engine identifying mitigating measures to reduce the privacy-risks by taking into account the factors that are contributing to higher risk. The system and method further include the recommendation engine providing a risk-based recommendation to reduce the privacy-risks in the input dataset. The system and method further include the recommendation engine providing actions to mitigate each privacy-risk identified by the scoring engine. The system and method further include the recommendation engine applying mitigation techniques to the dataset based on the mitigating measures defined in the config file or selected from the list of recommendations made by the recommendation engine. The system and method further include the mitigation techniques including at least one of deletion, multiplication, redaction suppression, and fuzzing, generalization, noise addition, aggregation and masking.

The scoring engine, of the system and method, may include a uniqueness sub-engine for determining whether each of the records in a dataset is unique in its entirety or with regards to subsets of columns that comprise the record, a similarity sub-engine that compares entire records and subsets of columns from at least two input datasets to determine the level of similarity in terms of data reproduction or overlap that exists, a statistical sub-engine that measures statistical characteristics that capture information about input datasets, the captured information used to determine the level of re-identification risk the input datasets contain, and a contextual sub-engine for quantifying contextual factors via weighting and producing a single context-centric score. The system and method further include the uniqueness sub-engine using an optimization step to identify subsets of columns that have high resolving power relative to the data subject. The system and method further include the scoring engine composing the various output scores into a single privacy-risk score. The system and method further include the scoring engine computing at least one privacy-risk score and produces a risk report by accounting for contextual factors and data-centric features in the input dataset. The system and method further include the scoring engine computing scores for at least one of a synthetic dataset, an anonymized dataset, a raw dataset, and a row-level datasets. The system and method further include the IO interface outputting the risk output for at least one input dataset. The system and method further include the system minimizing overt re-identification risks. The system and method further include the re-identification risks including potential risks specified in the configuration file.

FIG. 1 illustrates a system 10 for objective risk quantification. System 10 receives inputs including data inputs 2 and privacy control inputs 4. System 10 produces outputs including data output 6 and risk output 8. System 10 operates using a processor 70 with input/output interface 75 and input/output driver 80. System includes storage 60 and memory 65. System 10 includes a scoring engine 15, which includes a uniqueness sub-engine 20, a similarity sub-engine 30, a statistical sub-engine 40 and contextual sub-engine 50, and a recommendation engine 85.

As would be understood by those possessing an ordinary skill in the pertinent arts, scoring engine 15, including uniqueness sub-engine 20, similarity sub-engine 30, statistical sub-engine 40 and contextual sub-engine 50, may be interconnected via a bus, and may be placed in storage 60 and/or memory 65 and acted on by processor 70. Information and data may be passed to scoring engine 15 and the sub-engines including uniqueness sub-engine 20, similarity sub-engine 30, statistical sub-engine 40 and contextual sub-engine 50 internally to system 10 via a bus and this information and data may be received and sent via input/output interface 75.

Data inputs 2 may include an input dataset. By way of example, an example dataset is provided in Table 1. Data inputs 2 include datasets that are desired to be configured with privacy according to the defined privacy control inputs 4. Generally, data inputs 2 may include data such as 1 million or more credit card transactions, for example. Generally, data inputs 2 are formatted in a row and columnar configuration. The various columns may include specific information on the transaction included within the row. For example, using the credit card transaction example, one row may refer to a particular transaction. The columns in that row may include name, location, credit card number, CVV, signature, and swipe information for example. This provides a row representation of transactions and the columns referring to specific information about the transaction arranged in a columnar fashion. An exemplary sample data inputs 2 dataset is provided below in Table 1. The exemplary dataset includes customer_ID, name, payment_method, city, gender, weekly_amount, and frequency_of_purchase in the columns of the dataset and particular entries within the dataset for individuals represented in each of the columns of the dataset.

TABLE 1

Example Dataset 1

| Customer ID | Name | Payment method | City | Gender | Weekly amount | Frequency of purchase |
|---|---|---|---|---|---|---|
| 837001 | Steve | Online | London | M | 234 | 11 |
| 837002 | Tom | Online | New York | F | 456 | 23 |
| 837003 | James | Online | Dublin | M | 456 | 76 |
| 837004 | Zach | Online | Cork | F | 4567 | 7 |
| 837005 | Steve | Online | Manchester | M | 32 | 2 |
| 837006 | John | Online | Dallas | M | 67 | 8 |
| 837007 | Nisha | Online | New York | M | 342 | 2 |
| 837008 | Sylvie | Online | Paris | F | 76 | 76 |
| 837009 | Lukas | Online | Berlin | M | 235 | 22 |
| 837010 | Kate | Online | Frankfurt | F | 23 | 7 |
| 837011 | Scott | Online | Tokyo | M | 7232 | 24 |
| 837012 | John | Online | Berlin | M | 54 | 17 |

A second example dataset is provided in Table 2.

TABLE 2

Example Dataset 2

| Customer ID | Name | Payment method | City | Gender | Weekly amount | Frequency of purchase |
|---|---|---|---|---|---|---|
| 534543 | James | Online | London | M | 234 | 13 |
| 456237 | Steve | Online | New York | F | 428 | 22 |
| 776444 | Tom | Online | Dublin | M | 429 | 73 |
| 224674 | John | Online | Cork | F | 4382 | 6 |
| 145783 | Steve | Online | Manchester | M | 55 | 3 |
| 234433 | John | Online | Dallas | M | 23 | 9 |
| 222556 | Nisha | Online | New York | M | 359 | 3 |
| 777433 | Kate | Online | Paris | F | 76 | 58 |
| 235679 | Lukas | Online | Berlin | M | 255 | 21 |
| 94842 | Sylvie | Online | Frankfurt | F | 20 | 5 |
| 93649 | Scott | Online | Tokyo | M | 7223 | 22 |
| 28461 | John | Online | Berlin | M | 45 | 14 |

Privacy control inputs 4 include inputs that prescribe or dictate the requirements of the risk assessment of the dataset (s) and the scoring thereof. Privacy control inputs 4 may take the form of a computer file, for example. In a specific embodiment, privacy control inputs 4 may be a configuration file that is in a defined format. For example, an .INI or CONFIG file may be used. Privacy control inputs 4 may include, for example, data profile including column identifiers, quasi-identifiers, and the like, contextual risk factors, and input parameters. The privacy control inputs 4 may include, for example, whether the risk assessment and scoring is to be performed for a single dataset or two datasets, one being the original dataset and the second is the comparison (e.g., anonymized or synthetic) version of the dataset. An example configuration file for privacy control inputs 4 is included in Table 3.

TABLE 3

| Example Input Configuration File |
|---|
| [DATA PROFILE] |
| identifiers_columns = [Customer_ID] |
| quasi_identifiers_columns = [Name, City, Gender, Frequency_of_purchase, City] |
| sensitive_columns = [Weekly_amount] |
| ignore_columns = [Payment_method] |
| [CONTEXTUAL RISK FACTORS] |
| contextual_factor_1 = True |
| contextual_factor_2 = True |
| contextual_factor_3 = False |
| contextual_factor_4 = True |
| contextual_factor_5 = True |
| contextual_factor_6 = False |
| contextual_factor_7 = False |
| contextual_factor_8 = False |
| contextual_factor_9 = True |
| contextual_factor_10 = True |
| contextual_factor_11 = False |
| contextual_factor_12 = False |
| contextual_factor_13 = True |
| contextual_factor_14 = True |
| [INPUT PARAMETERS] |
| recommendations = True |
| number_of_input_dataset = 2 |
| original_dataset = dataset_1 # required in case of two datasets, one is original and the other would be a comparison version of the input dataset or some other dataset to be compared. |
| comparison_dataset = dataset_2 |
| Privacy_Defntion = None # other values include k-anonymity, l-diversity, t-closeness. |

The content of the privacy control input may include details on risk assessment and risk scoring requirements. This may include the number of datasets, whether the recommendations are turned on, and whether the dataset must comply with a formal privacy definition, including k-anonymity, I-diversity or t-closeness by example.

Uniqueness sub-engine 20 provides a uniqueness analysis of the data input 2 and the ability for each of the records to be unique in a population set from various aspects by considering attributes in the records in isolation, as well as in combination with other attributes (quasi-identifiers). Uniqueness sub-engine 20 searches through the dataset to find hidden re-identification risks in terms of uniqueness. Additionally, the uniqueness sub-engine 20 quantifies how strongly an attribute that is a quasi-identifier or combination of (quasi-identifier) attributes is correlated with the identifiers in the dataset.

Uniqueness sub-engine 20 receives as input the data inputs 2 and the specified privacy control inputs 4. Uniqueness sub-engine 20 operates to determine whether each of the records in the input dataset is unique in a population set at data-subject level, data level, and computes the scores for uniqueness. Uniqueness sub-engine 20 then operates to determine the score for data uniqueness with the data inputs 2. Scoring in the scoring engine 15 and the uniqueness sub-engine 20 is described in FIG. 3 and the scoring in the uniqueness sub-engine 20 is further described with respect to FIG. 4.

Similarity sub-engine 30 receives as input the data inputs 2 and the specified privacy control inputs 4. Similarity sub-engine 30 calculates similarity on the data using similarity metrics such as (but not limited to) one to one, one to many, many to one, same to same, any to any row-level similarity measures for combinations of attributes (columns) to discover the risk of re-identification. Subsequently, the similarity sub-engine 30 determines similarity scores for each row-level similarity metric, combines all the similarity scores into a single score and produces a similarity report for the given datasets.

Based on the desired configuration, similarity sub-engine 30 checks the specification, such as defined in privacy control inputs 4, for the required dataset. The unified scoring engine 15 and the similarity sub-engine 30 is described in FIG. 3 and the components of similarity sub-engine 30 in-terms of similarity metrics are further described with respect to FIG. 5.

Statistical sub-engine 40 receives as input the data inputs 2 and the specified privacy control inputs 4. Statistical sub-engine 40 computes various statistical properties about the data, measures statistical characteristics that capture information about input datasets which can be used to determine the level of re-identification risk the input datasets contain. The scoring engine 15 and the statistical sub-engine 40 is described in FIG. 3 and the components in the statistical sub-engine 40 is further described with respect to FIG. 6.

Contextual sub-engine 50 receives as input the data inputs 2 and the specified privacy control inputs 4. Contextual sub-engine 50 computes a context-centric privacy-risk score by considering specified contextual factors specified in configuration file for the given input dataset. Additionally, contextual sub-engine 50 combines the score into one single contextual score. The scoring engine 15 and the contextual sub-engine 50 is described in FIG. 3 and the components of the contextual sub-engine 50 is further described with respect to FIG. 7.

Recommendation engine 85 receives the data inputs 2 and privacy control inputs as well as the outputs from each of the scoring engines 15, including uniqueness sub-engine 20, similarity sub-engine 30, statistical sub-engine 40 and contextual sub-engine 50, in order to recommend process(es) to reduce identified privacy-risks. For example, recommendation engine 85 may indicate that privacy-risk is high due to "Factor 5". "Factor 5" needs to be reviewed. Alternatively, attributes A, B, C, D need attention. Recommendation engine 85 recommends additional generalization of attribute D.

Recommendation engine 85 enables a user or a system, such as system 10, to take mitigating measures to reduce the privacy-risks by taking into account the factors that are contributing to higher risk. For example, if the data-centric risk is high the user can deploy additional anonymization approaches or stricter privacy models to reduce the risk. Another example of the operation of the recommendation engine 85 occurs when the dataset is accessible by a large number of people in an organization, recommendation engine 85 based on a certain score may recommend to decrease the number of people having access to that dataset. If configured to do so, the recommendation engine also applies configured mitigation techniques to the output data based on the risk report, including noise addition, multiplication, suppression, fuzzing, and returns the mitigated dataset, and the risk profile of the mitigated dataset.

While each of uniqueness sub-engine 20, similarity sub-engine 30, statistical sub-engine 40 and contextual sub-engine 50 are described as engines, each of these includes software and the necessary hardware to perform the functions described. For example, in computer programming, an engine is a program that performs a core or essential function for other programs. Engines are used in operating systems, subsystems or application programs to coordinate the overall operation of other programs. The term engine is also used to describe a special-purpose program that uses algorithms to query data. Each of these engines uses an algorithm to operate on data to perform a function as described.

A check unit (not shown in FIG. 1, but see FIG. 3) may be included within system 10. Check unit may be included within the scoring engine 15 and/or may be included individually within system 10. Check unit may perform a threshold check on the dataset outputted from the scoring engine 15, or any of the sub-engines 20, 30, 40, 50. Such a check may determine if the risks are under the configured thresholds, deeming the data safe for the given privacy control input, and releasing the data. If the risks are not under the configured limits, then a recommendation is determined, such as from recommendation engine 85, and employed before iteratively executing the scoring engine 15, or any of the sub-engines 20, 30, 40, 50, until the risks are under the prescribed limits. This iterative step is necessary as new risks can be introduced to the output dataset through the mitigation of previous risks.

The storage 60 includes a fixed or removable storage, for example, a hard disk drive, a solid state drive, an optical disk, or a flash drive. Input devices (not shown) may include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). Output devices include, without limitation, an output device 90 (display), a speaker, a printer, a haptic feedback device, one or more lights, an antenna, or a network connection (e.g., a wireless local area network card for transmission and/or reception of wireless IEEE 802 signals).

In various alternatives, the processor 70 includes a central processing unit (CPU), a graphics processing unit (GPU), a CPU and GPU located on the same die, or one or more processor cores, wherein each processor core can be a CPU or a GPU. In various alternatives, the memory 65 is located on the same die as the processor 70, or is located separately from the processor 70. The memory 65 includes a volatile or non-volatile memory, for example, random access memory (RAM), dynamic RAM, or a cache.

The input/output driver 80 communicates with the processor 70 and the input devices (not shown), and permits the processor 70 to receive input from the input devices via input/output driver 75. The input/output driver 80 communicates with the processor 70 and the output devices 90 via input/output driver 75, and permits the processor 70 to send output to the output devices 90. It is noted that the input/output driver 80 are optional components, and that the system 10 will operate in the same manner if the input/output driver 80 is not present.

Individual scores per factor in scoring engine 15 may be passed directly as outputs (data output 6, risk output 8). Data output 6 may include a single score, individual scores, including uniqueness score, similarity score, statistical score and contextual score, and recommendations via risk output 8 by illustrating the effect of each matrix/factor on the scores based on which actionable recommendation is given.

Figure 2:
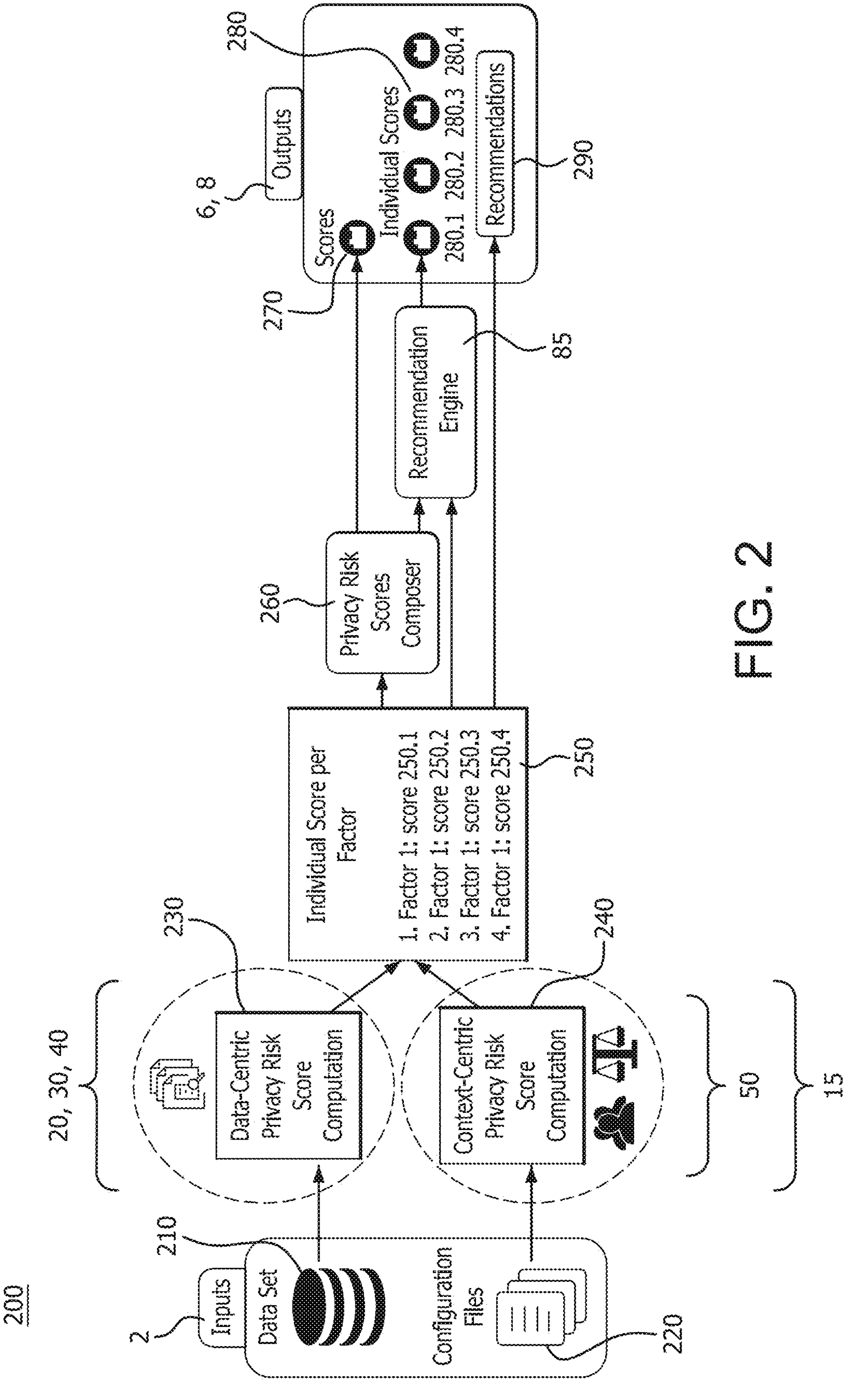
FIG. 2 illustrates a flow of data within the system of FIG. 1.

FIG. 2 illustrates a flow 200 of data within the system 10 of FIG. 1. Flow 200 is initiated by receiving inputs 2 to the system 10. Inputs 2 may include any number of datasets 210 and configuration files 220. As described by the example above, dataset 210 is a dataset that needs to be anonymized, a dataset to be used for comparison purposes, such as an anonymized dataset, a synthesized dataset or a dataset produced by executing similar code using different configuration parameters or different input data as described above. Configuration files 220 is the configuration object file.

The inputs 2 are passed to the engines 15 of the system 10. These engines 15 include contextual sub-engine 50 designed to perform a context-centric privacy-risk score computation 240. The engines 15 include uniqueness sub-engine 20, similarity sub-engine 30 and statistical sub-engine 40 that cooperatively perform data-centric privacy-risk score computation 230. The data-centric privacy-risk score computation 230 is designed in terms of similarity, uniqueness, and statistical computations.

Once each of the engines 15 operate to produce the data-centric privacy-risk score computation 230 and context-centric privacy-risk score computation 240, the values and the inputs are passed as individual scores per factor 250. These may include a factor 1 score 250.1, a factor 2 score 250.2, a factor 3 score 250.3 and a factor 4 score 250.4 (collectively individual scores per factor 250). In one embodiment, similarity metrics are calculated by measuring similarity between the quasi-identifiers identified in two datasets. In one embodiment, uniqueness computes the ability of each quasi-identifier to resolve to or single out a data subject.

Individual scores per factor 250 are passed to the privacy-risk scores composer 260. This composer 260 combines the individual scores per factor 250 into a single score 270. Single score 270 is the combination of qualitatively different metrics. In order to combine the individual factors 250 into a single score 270 in the composer 260, an addition approach or weighted approach may be used. The addition approach adds the respective underlying scores 250 equally to provide the single score 270. A weighted approach provides weights to certain scores 250, such a 2:1, 3:1, 4:1, etc., as needed. This may include addition or weighting of between similarity score 280.1, uniqueness score 280.2, statistical score 280.3 and contextual score 280.4.

Individual scores per factor 250 are also passed to the recommendation engine 85. As described above, recommendation engine 85 provides recommendations 290. Recommendations 290 may include details on how to reduce the privacy-risks, based output 1, output 2, and output 3.

Individual scores per factor 250 are also passed directly as outputs 6, 8 in a detailed risk report. This provides low-level privacy-risk score of each factor including a contextual score 280.4, a similarity score 280.1, a uniqueness score 280.2 and a statistical score 280.3. These scores 280 may be provided in a matrix.

Outputs 6, 8 include single score 270 output from composer 260, individual scores 280, including first score 280.1, second score 280.2, third score 280.3 and fourth score 280.4 (collectively individual scores 280), and recommendations 290. Output 6, 8 shows the effect of each metric and factor on the scores based on which actionable recommendation is given.

Data output 6 and risk output 8 are provided in sample form below. An example output file including data output 6 and risk output 8 is included in Table 4.

TABLE 4

Example Output Data and Risk Output

```
********************************[OUTPUT]********************************
Dataset_name: dataset_1
Number of columns = 7
Number of rows = 12
Number of numeric columns = 3
Number of categorical columns = 4
Overall quantitative privacy-risk Score (normalized between 1 to 10-10 means high and 1 mean low)
= 4
*************************[UNIQUENESS]********************************
[UNIQUENESS SCORES-one dimensional Data-level uniqueness score]
Column[Name] = 4
Column[City] = 8
Column[Gender] = 4
Column[Frequency_of_purchase] = 4
[UNIQUENESS SCORES-one dimensional subject-level uniqueness score]
Column[Name] = 5
Column[City] = 7
Column[Gender] = 2
Column[Frequency_of_purchase] = 3
[UNIQUENESS SCORES-multi dimensional data-level uniqueness score]
Column[Name      City] = 4
Column[Name      City                      Gender ] = 8
Column[City      Gender] = 8
Column[Gender    Frequency_of_purchase] = 2
Column[City      Gender                    Frequency_of_purchase] = 6
Column[Name      City                      Gender     Frequency_of_purchase] = 3
[UNIQUENESS SCORES-multi dimensional subject-level uniqueness score]
Column[Name      City] = 4
Column[Name      City                      Gender ] = 8
Column[City      Gender] = 9
Column[Gender    Frequency_of_purchase] = 2
Column[City      Gender                    Frequency_of_purchase] = 8
Column[Name      City                      Gender     Frequency_of_purchase] = 9
SINGLE UNIQUENESS SCORE = 4
****************************[SIMILARITY]*******************************************
[SIMILARITY SCORES]
Similarity score 1 = 5
Similarity score 2 = 3
Similarity score 3 = 2
Similarity score 4 = 4
Similarity score 5 = 2
Similarity score 6 = 1
Similarity score 7 = 4
SINGLE SIMILARITY SCORE = 3
****************************[STAT]*******************************************
[STAT SCORES]
Stat score 1 (difference in standard deviation) = 3
Stat score 2 (difference in absolute deviation) = 2
*************************[CONTEXTUAL]*************************************
[CONTEXTUAL RISK FACTORS SCORE-normalized between 1 to 10]
contextual_factor_1 = 3
contextual_factor_2 = 4
contextual_factor_3 = 0
contextual_factor_4 = 1
contextual_factor_5 = 2
contextual_factor_6 = 0
contextual_factor_7 = 0
contextual_factor_8 = 0
contextual_factor_9 = 8
contextual_factor_10 = 4
contextual_factor_11 = 0
contextual_factor_12 = 0
contextual_factor_13 = 4
contextual_factor_14 = 3
SINGLE CONTEXTUAL SCORE = 4
*************************[RECOMMENDATIONS]*****************************
The privacy-risk can further be minimized by:
contextual_factor_9: Limiting access to dataset
Generalize the Column name "City"
```

There is a privacy-risk score, the single score 270 that can include color coding, individual privacy-risk scores 280 including similarity 280.1, uniqueness 280.2 and statistical 280.3 determined from the metrics. The contextual score 280.4 may include low-level privacy-risk score of each contextual factor, such as factor 1:3, factor 2:4, factor 3:1, factor 4:3 and factor 5:9 (High). By way of example only, factors may include whether the data is to be released internally or to the public, whether the purpose or use case of the data is defined, whether there are externally observable attributes in the dataset, and the frequency of producing analytical reports, for example. Recommendations 290 may include that the privacy-risk is high due to "Factor 5" and "Factor 5" needs to be reviewed. Further, recommendations 290 may include A, B, C, D needs attention. Recommendation may generalize attribute D. The output of the system enables the user of the system to have an accurate estimate of privacy-risk and to take mitigating measures to reduce the privacy-risks by taking in to account the factors that are contributing in higher risk. For example, if the data-centric risk is high, the user can deploy additional anonymization approaches or stricter privacy models to reduce the risk. In other words, the technical effect of the system is the anonymized data with mitigated privacy-risks.

In the example output in Table 4, the name of the dataset is output and the properties of the dataset are included. For example, the number of rows and columns are provided, as well as the number of numeric columns and rows. As represented in the sample output, the overall quantitative privacy-risk score is also provided.

Focusing on the uniqueness output, the scores in uniqueness for one dimensional data-level uniqueness are provided based on individual columns of the dataset, the scores in uniqueness for one dimensional data subject-level uniqueness are provided based on columns of the dataset when correlated with identifier columns, the scores in uniqueness for multi-dimensional data-level uniqueness are provided based on combinations of columns of the dataset, the scores in uniqueness for multi-dimensional data subject-level uniqueness are provided based on combinations of columns of the dataset correlated with identifier columns, and a single uniqueness score is provided. The one dimensional data-level uniqueness score identifies how unique the values within one column are, the multi-dimensional data-level uniqueness identifies how unique the combination of values for a set of columns are, the one dimensional subject-level uniqueness identifies how strongly correlated the values in the column is to the subjects, and the multi-dimensional subject-level uniqueness identifies how strongly the combinations of column values are correlated to subjects. Due to the high number of potential combinations of columns in wide datasets, an optimization step 415 is included in the uniqueness sub-engine 335.

For similarity, a similarity score for certain elements are provided and a single similarity score is also provided. The similarity scores are computed using different similarity metrics, for example, one-to-one metric identifies how similar two datasets are in terms of the percentage of rows in the comparison dataset that occur exactly once in the original dataset and are there exactly once in the comparison dataset, which in essence represents the risk of singling out of an individual from the given datasets.

The statistical score provides an indication of potential privacy-risk in terms of outlier values. For instance, in case there are only few values outside the 3 standard deviation range then it is an indication that those values are outliers that may lead to the re-identification of an individual in the dataset.

For contextual risk factors, a contextual risk factor score is provided, as well as scores for each identified contextual factors. The contextual factor scores represent the strength/amplification ability of each factor to influence the privacy risk inherent in the datasets.

The output may also include the recommendations, which in the exemplary output in Table 4 illustrates that the privacy-risks can further be minimized by limiting access to the dataset, based on contextual factor 9, and by generalizing the column name to "city."

Figure 3:
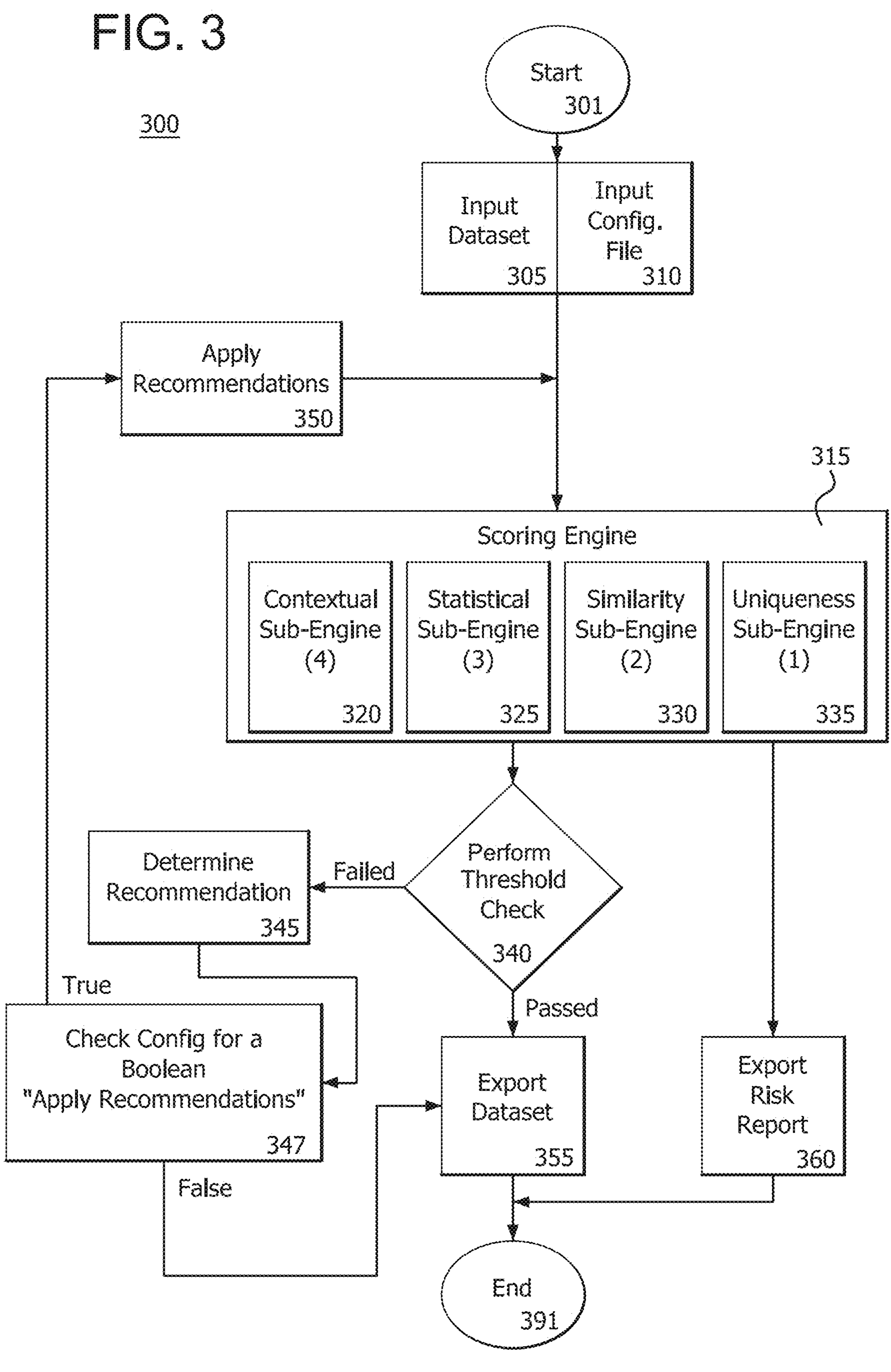
FIG. 3 illustrates a method for objective quantification and mitigation of privacy-risk performed in the system of FIG. 1.

FIG. 3 illustrates a method 300 for objective risk quantification performed in the system of FIG. 1. Method 300 starts as indicated at step 301. At step 305 one or more datasets are input and at step 310 a configuration file is input. As discussed above, the one or more input datasets may be datasets that need to be anonymized, datasets to be used for comparison purposes such as a previously or known anonymized dataset, synthesized datasets or datasets produced by executing similar code using different configuration parameters, for example, or different input data formed to represent at dataset or dataset surrogate. Further, the configuration file may take the form of a configuration object file.

The received one or more datasets from step 305 and the received configuration file from step 310 are provided to a scoring engine for scoring at step 315. The scoring engine may include one or more sub-engines. While each of scoring engine, uniqueness sub-engine, similarity sub-engine, statistical sub-engine and contextual sub-engine are described as engines, each of these includes software and the necessary hardware to perform the functions described. For example, in computer programming, an engine is a program that performs a core or essential function for other programs. Engines are used in operating systems, subsystems or application programs to coordinate the overall operation of other programs.

A first sub-engine may be the uniqueness sub-engine and scoring in the uniqueness sub-engine is performed at step 335. This scoring in the uniqueness sub-engine is further described with respect to FIG. 4.

A second sub-engine may be the similarity sub-engine and scoring in the similarity sub-engine is performed at step 330. This scoring in the similarity sub-engine is further described with respect to FIG. 5.

A third sub-engine may be the statistical sub-engine and scoring in the statistical sub-engine is performed at step 325. This scoring in the statistical sub-engine is further described with respect to FIG. 6.

A fourth sub-engine may be the contextual sub-engine and scoring in the contextual sub-engine is performed at step 320. This scoring in the contextual sub-engine is further described with respect to FIG. 7.

After scoring in the scoring engine in step 315, including by each of the sub-engines, such as uniqueness sub-engine at step 335, similarity sub-engine at step 330, statistical sub-engine at step 325 and contextual sub-engine at step 320, a threshold check is performed at step 340. If the threshold check is failed, then method 300 continues and determines a recommendation at step 345. At step 347, the CONFIG file is checked for Boolean "Apply Recommendations." If the flag at step 347 is false, the method proceeds from step 347 to step 355 and the dataset is exported as if the threshold check at step 340 passed. If the flag at step 347 is true, the determined recommendation is applied at step 350 and scoring in the scoring engine at step 315 is repeated.

If the threshold check at step 340 is passed, then the dataset is exported in step 355. The scoring engine as described in step 315, including by each of the sub-engines, such as uniqueness sub-engine at step 335, similarity sub-engine at step 330, statistical sub-engine at step 325 and contextual sub-engine at step 320, exports a risk report at step 360. Method concludes by ending at step 391.

Figure 4:
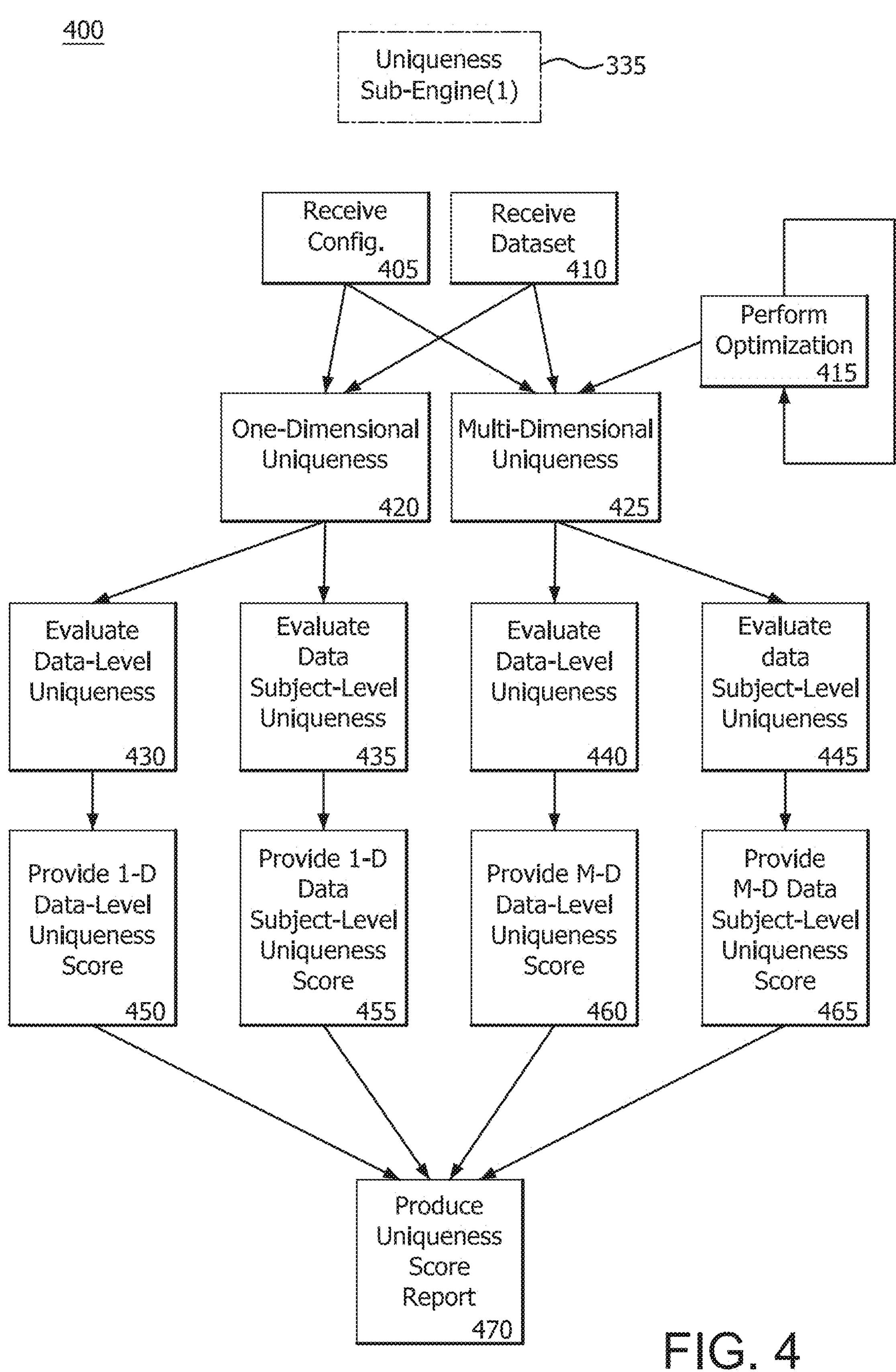
FIG. 4 illustrates a method performed by the uniqueness sub-engine of FIG. 3.

FIG. 4 illustrates a method 400 performed by the uniqueness sub-engine 335 of FIG. 3. Method 400 includes receiving the configuration file at step 405 received by the system via input configuration file at step 310 of method 300. Method 400 includes receiving the dataset(s) at step 410 received by the system via input dataset at step 305 of method 300. The uniqueness sub-engine 335 uses metrics such as data-level uniqueness and data subject-level uniqueness. The received dataset and configuration file are provided as inputs to one-dimensional uniqueness scoring at step 420 and multi-dimensional uniqueness scoring at step 425. The multi-dimensional uniqueness scoring at step 425 may be performed using an optimization at step 415. There are a set of uniqueness metrics, for example, that measure the correlation between the identifier columns and quasi-identifier columns. Optimization step 415 is for multi-dimensional uniqueness metrics and is a way to efficiently search through what could possibly be a very large number of combinations of columns. For datasets with a high number of columns, the number of combinations of these columns to explore grows exponentially. At some point, it becomes inefficient and/or infeasible to investigate every single column combination, and thus an optimization/search technique may be employed (e.g., hillclimber, Genetic Algorithm, gradient descent, simulated annealing, etc.). After the one-dimensional uniqueness split at step 420, method 400 includes evaluating data-level uniqueness at step 430 and evaluating data subject-level uniqueness at step 435. After the multi-dimensional uniqueness split at step 425, method 400 includes evaluating data-level uniqueness at step 440 and evaluating data subject-level uniqueness at step 445. The subject-level one-dimensional uniqueness metrics compute how strongly the individual quasi-identifiers are correlated with the identifier columns. The subject level multi-dimensional uniqueness metrics quantify how strongly each set of quasi-identifiers are correlated with the identifier columns. The data level uniqueness metrics ignore the number of subjects and considers the number of records in the dataset.

After evaluating data-level uniqueness at step 430, method 400 includes providing a one-dimensional data-level uniqueness score at step 450 to quantify data-level one-dimensional uniqueness. After evaluating data subject-level uniqueness at step 435, method 400 includes providing a one-dimensional data subject-level uniqueness score at step 455 to quantify data subject-level one-dimensional uniqueness.

After evaluating data-level uniqueness at step 440, method 400 includes providing a multi-dimensional data-level uniqueness score at step 460 to quantify data-level multi-dimensional uniqueness. After evaluating data subject-level uniqueness at step 445, method 400 includes providing a multi-dimensional data subject-level uniqueness score at step 465 to quantify data subject-level multi-dimensional uniqueness.

The one-dimensional data-level uniqueness score, one-dimensional data subject-level uniqueness score, multi-dimensional data-level uniqueness score and multi-dimensional data subject-level uniqueness score are combined in step 470 to produce a uniqueness score report.

Figure 5:
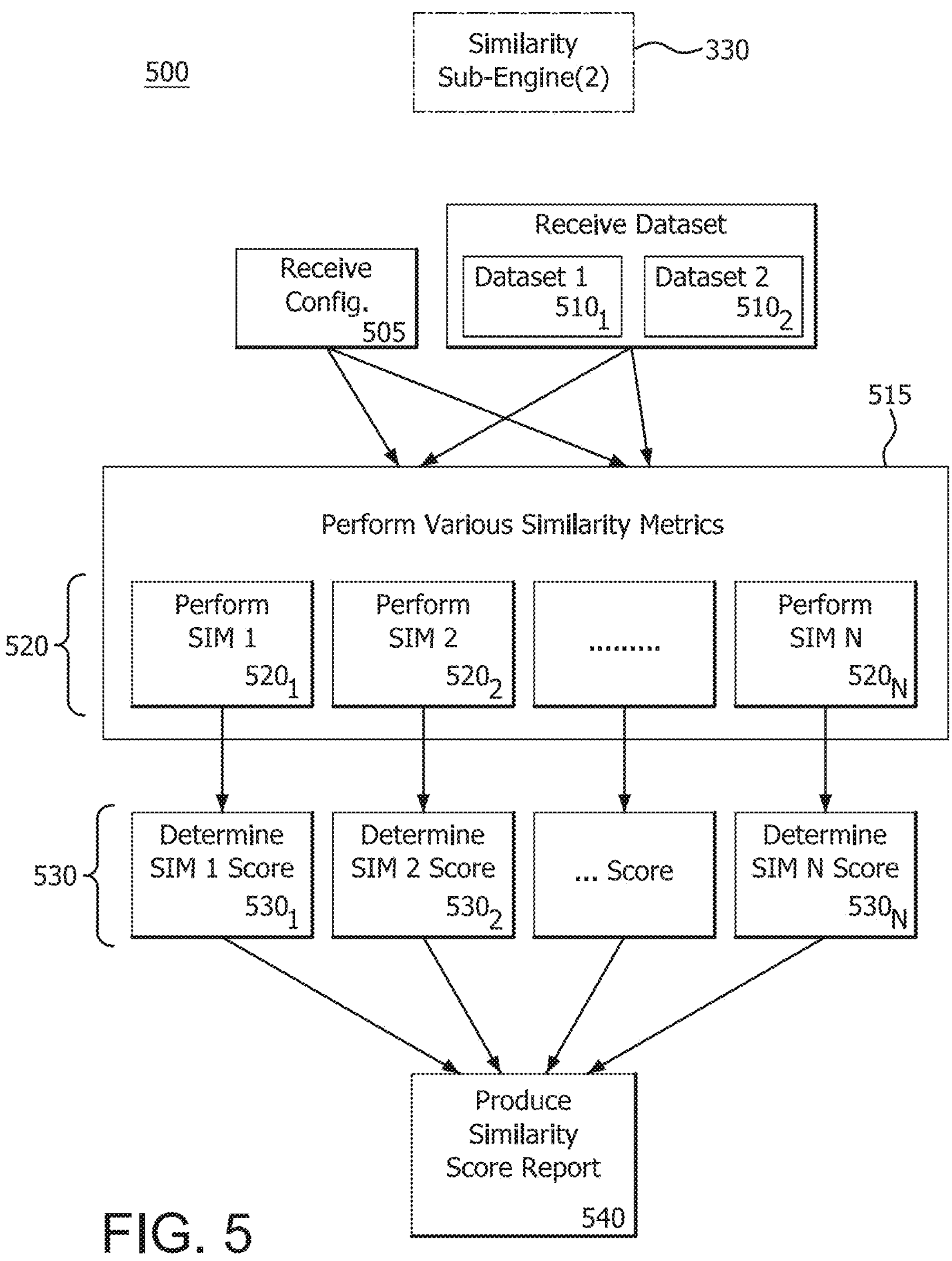
FIG. 5 illustrates a method performed by the similarity sub-engine of FIG. 3.

FIG. 5 illustrates a method 500 performed by the similarity sub-engine 330 of FIG. 3. Method 500 includes receiving the configuration file at step 505 received by the system via input configuration file at step 310 of method 300. Method 500 includes receiving at least two datasets ($\text{Dataset}_1$, $\text{Dataset}_2$) at step 510 (step $\mathbf{510}_1$,$\mathbf{510}_2$) received by the system via input datasets at step 305 of method 300. The similarity sub-engine 330 measures the similarity between at least two datasets, e.g., the original dataset and a modified version of that dataset. The received datasets and configuration file are provided as inputs to perform various similarity metrics at step 515. The performance of various similarity metrics may include performing specific similarity metrics across multiple dimensions in the datasets, such as performing similarity metric 1 at step $\mathbf{520}_1$, performing similarity metric 2 at step $\mathbf{520}_2$, . . . , and performing similarity metric N at step $\mathbf{520}_N$ (collectively similarity metrics at step 520).

After performing the similarity metrics at step 520, scores are determined at step 530. Specifically, similarity metric 1 enables a similarity 1 score to be determined at step $\mathbf{530}_1$, similarity metric 2 enables a similarity 2 score to be determined at step $\mathbf{530}_2$, . . . , and similarity metric N enables a similarity N score to be determined at step $\mathbf{530}_N$.

The similarity 1 score, similarity 2 score, . . . , and similarity N score are combined in step 540 to produce a similarity score report. In one embodiment, the similarity sub-engine 330 produces one to one (1-1), one to many (1-M), many to one (M-1), same to same (S-S), any to any (A-A) and fuzzy similarity outputs.

Figure 6:
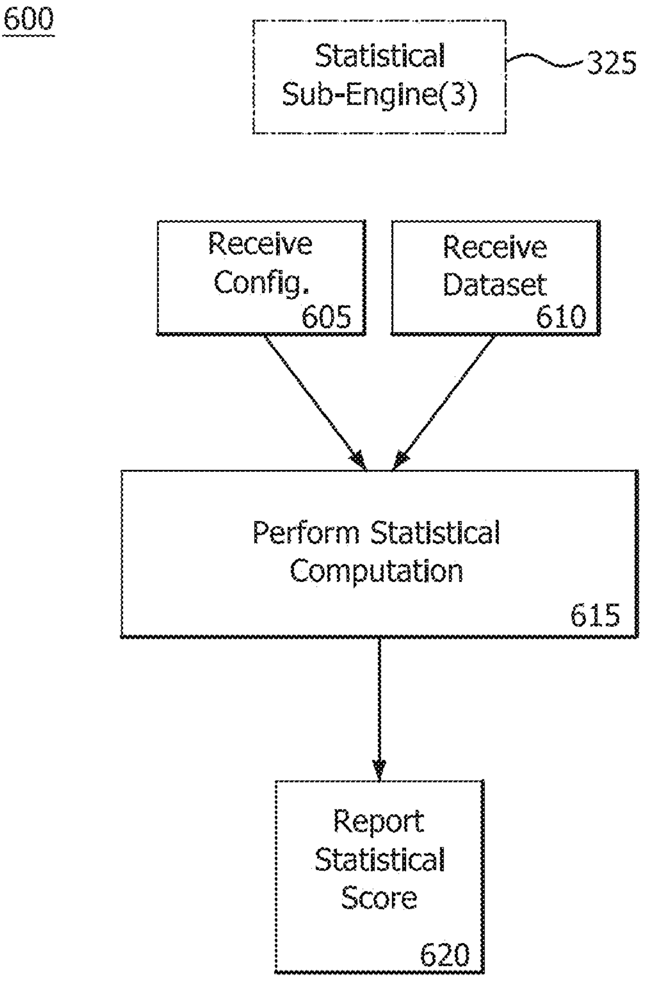
FIG. 6 illustrates a method performed by the statistical sub-engine of FIG. 3.

FIG. 6 illustrates a method 600 performed by the statistical sub-engine 325 of FIG. 3. Method 600 includes receiving the configuration file at step 605 received by the system via input configuration file at step 310 of method 300. Method 600 includes receiving the dataset at step 610 received by the system via input dataset at step 305 of method 300. At step 615, method 600 performs a statistical computation based on the received dataset and configuration file by computing statistics over various columns. The statistics may include standard deviation, median absolute deviation, and the like. Based on the performed statistical computation, method 600 reports the statistical score at step 620.

Figure 7:
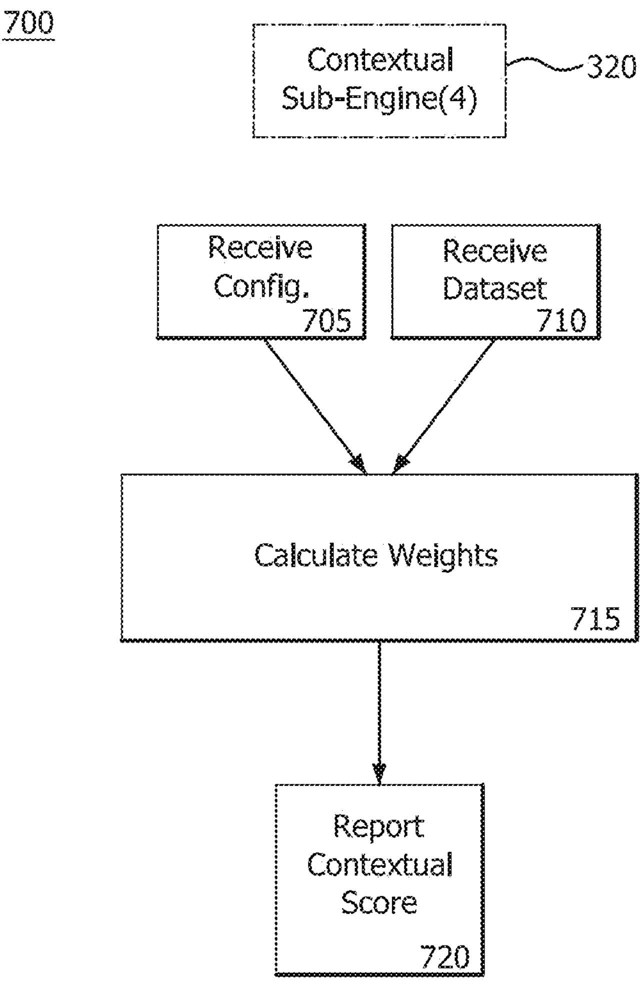
FIG. 7 illustrates a method performed by the contextual sub-engine of FIG. 3.

FIG. 7 illustrates a method 700 performed by the contextual sub-engine 320 of FIG. 3. Method 700 includes receiving the configuration file at step 705 received by the system via input configuration file at step 310 of method 300. Method 700 includes receiving the dataset at step 610 received by the system via input dataset at step 305 of method 300. At step 715, method 700 calculates weights based on the received dataset and configuration file. Contextual sub-engine 320 may have pre-defined set of weights for each contextual factor. Based on the calculated weights, method 700 reports the contextual score at step 720. For example, the factor of whether the purpose or use case of the data is defined is assigned a normalized weight of 0.4, for example.

Figure 8:
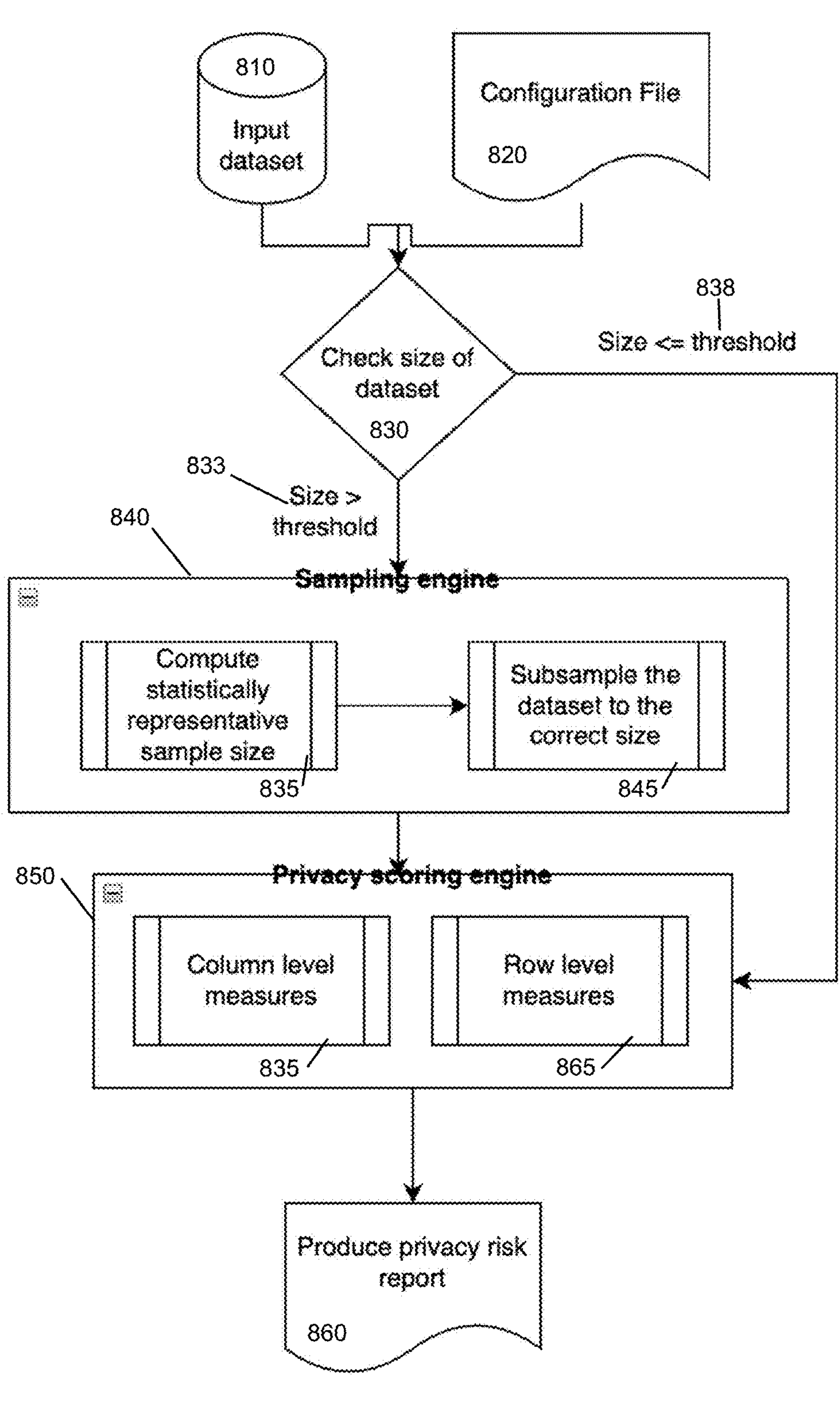
FIG. 8 illustrates a method for estimating privacy risk measures from samples of a dataset.

FIG. 8 illustrates a method 800 for estimating privacy risk measures from samples of a dataset. Using method 800, a system quantitatively measures privacy risk in a dataset in an optimised fashion by using a combination of scores—some computed on the full dataset and some from a sample of the dataset.

Generally, the use of sampling refers to row sampling—randomly picking a subset of rows in the dataset. Privacy risk refers to data-centric privacy risk metrics—measures that are computed on the dataset to derive a quantitative privacy-risk measure. Risk measures can be categorised as either row-level or column-level measures. For example entropy measures are column level measures, such measures quantify how much a particular column can reduce the uncertainty in singling out an individual. An example of a row level measure is k-anonymity—this quantifies the smallest number of subjects (typically rows) that can be singled out. Measures computed by the uniqueness sub-engine may typically be considered row-level while those computed as part of the statistical sub-engine may be classified as column-level measures and therefore applicable for optimisation through the application of sampling.

Using method 800, a system efficiently estimates column-level scores on a representative sample of the data while computing row-level scores on the full dataset, thereby ensuring that accuracy of privacy risk measurement is maintained. In order to ensure no bias is introduced through the sampling, the system may perform simple random sampling to ensure that the sample is taken in a random fashion—each row in the original data may have the same likelihood of being selected in the sample. Depending on the underlying system architecture, this randomness may be achieved in different ways. For example in one implementation, a random ID may be assigned to each row and the rows matching the first N IDs selected.

For column-level privacy risk measures, the system implements two versions—one for the case where the measure is computed over the full dataset and a second for the case where a sample is used. The sample versions contain built-in correction terms to ensure that any sampling error is accounted for and mitigated. As an example, for privacy measures which are based on entropy, measures that account for the likely groups that were not included in the sample are applied. Some examples of these alternate versions are Miller-Madow entropy and James-Stein entropy.

Method 800 includes receiving an input dataset at 810 and a configuration file at 820 to the system. Method 800 also includes checking the size of the input dataset at 830. This checking may include electronically reading the dataset and verifying the number of records present. If the dataset is determined to be above the sampling threshold at 833, the sampling engine 840 activates. A sample size is computed at 835 to achieve the confidence level specified in the configuration file input at 820. A random sample of the data is taken at 845 so that the number of rows matches the size determined at 835.

In scoring engine 850, column-level privacy measures and column statistics are computed for each column in the sample dataset at 855. Any corrections required to these measures to mitigate for sampling error are automatically applied as part of this step. An intelligent search is performed on the sample dataset to unearth risky combinations of columns. This search is determined by column-level privacy scores at 855, hence this step also provides these privacy scores for each combination that is found. By running over the sampled dataset at 855, the system may very quickly identify those risky column combinations (quasi-ids) that would otherwise be hidden.

At 865, method 800 performs row-level privacy measures by computed on the full dataset for each column in the original dataset. For each quasi-id identified at 855, row-level privacy measures are computed over the full dataset.

The output of 855, 865 are collected into a summary report detailing all privacy measures. Note that scores aren't separated by dataset (sample or full) rather a single view is returned for the dataset as a whole.

If the dataset is determined to be below the sampling threshold at 838 the scoring engine is activated. For small datasets there is little benefit from sampling so the system will compute all privacy measures over the entire dataset. Beyond a configurable threshold sampling is applied. The system will sample a sufficient number of rows to achieve a configurable level of statistical representativeness. Rather than a flat percentage the configuration specifies a desired confidence level that the sample should achieve. Note that this computation of the optimal sample size is performed by the system—the sample size is computed to ensure that all column-level statistics achieve this specified confidence level. The larger the dataset the bigger the saving in compute time made by performing sampling. For example, for an input confidence level of 99.9%, a dataset with 10 million rows would require a sample of 887,951 or just under 9%. A 50 million row dataset would need 955,851 rows to meet the threshold of representativeness, just under 2% of the original data size. Method 800 includes via the scoring engine 850, performing column level measures at 855 and row level measures 865 on the full dataset with no sampling performed.

At 860, method 800 produces and outputs the privacy risk report by the system.

Figure 9:
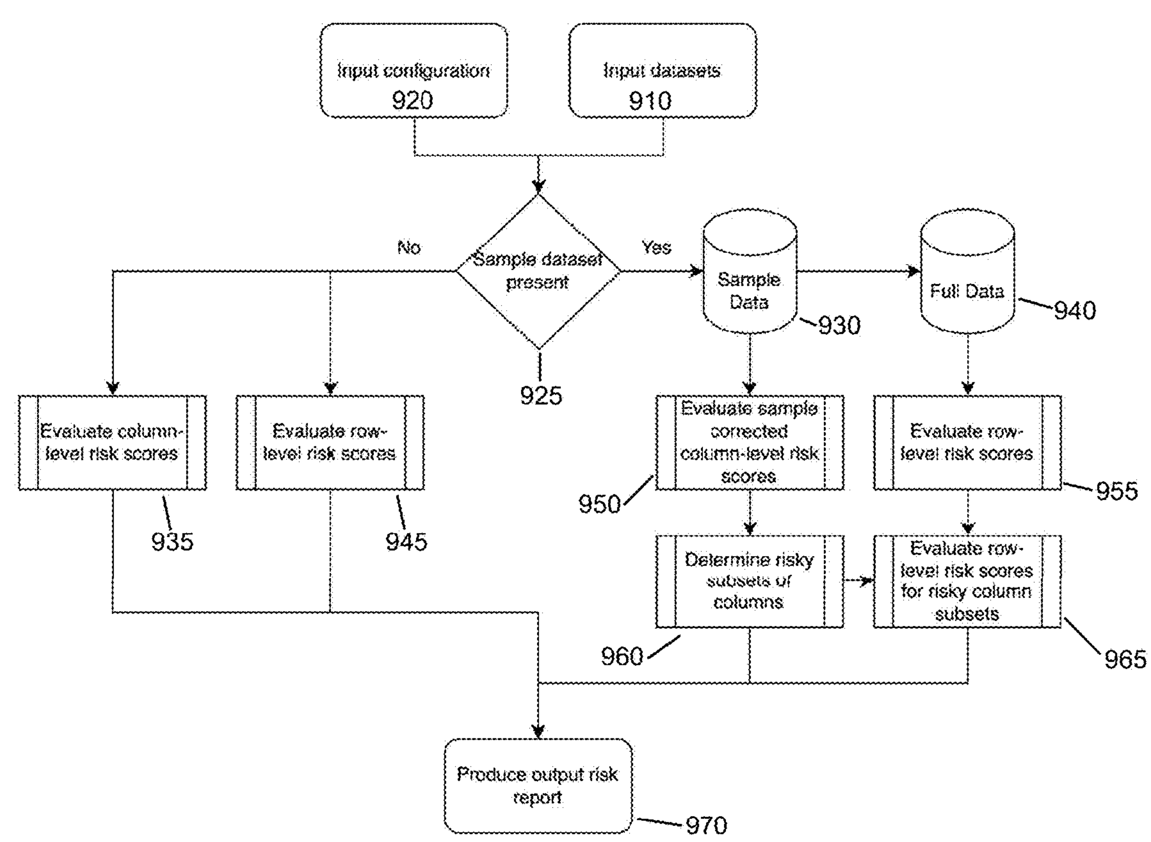
FIG. 9 illustrates a scoring engine flow according to the method of FIG. 8.

FIG. 9 illustrates a scoring engine flow 900 according to the method of FIG. 8. Flow 900 includes inputting a dataset at 910 and a configuration file at 920. A determination is made at 925 whether a sample data sets is presents at 925. This determination may be made based on the size of the dataset, for example. If the sample dataset is not present, an evaluation of column-level risks scores at 935 and an evaluation of row-level risk scores at 945 are determined. Such determinations may be performed as described herein. Flow 900 may include production of an output risk report at 970.

If the sample dataset is present, a set of sample data may be determined at 930 and the full set of data determined at 940. The full set of data may be evaluated for row-level risk scores at 955 and an evaluation of row-level risks scores for risky column subsets at 965.

The sample data from 930 may be evaluated for sample corrected column-level risk scores at 950 and a determination of risky subsets of columns at 960. The determined risky subsets of column data at 960 may be connected with the risky column subsets at 965. Flow 900 may include production of an output risk report at 970.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system for estimating privacy risk measures, the system comprising:

an input-output (IO) interface programmed to access at least one input dataset, on at least one of which a measurement of the risk is to be performed;

a processor programmed to:

determine the size of at least one dataset from among the at least one input dataset;

based on the size of the at least one dataset being larger than a threshold, compute a statistically representative sample size, subsample the at least one dataset based on the representative sample size, and estimate a privacy risk based on the subsampled dataset; and perform one or more column level measurements on the subsampled dataset and one or more row level measurements on the at least one dataset; and compute a privacy risk based on the column level measurements on the subsampled dataset and the row level measurements on the at least one dataset, wherein based on the column level and row level measurements, the IO interface outputs a privacy risk.

2. The system of claim 1, wherein the processor is further programmed to, based on the size of at least one dataset being smaller than a threshold, perform column level measurements on at least one dataset and row level measurements on at least one dataset.

3. The system of claim 1, wherein the processor is further programmed to identify one or more mitigating measures to reduce the privacy risk by taking into account the factors that are contributing to higher risk.

4. The system of claim 3, wherein the processor is further programmed to provide a risk-based recommendation to reduce the privacy risk in the input dataset.

5. The system of claim 3 wherein the processor is further programmed to provide one or more actions to mitigate each privacy-risk identified by the scoring engine.

6. The system of claim 3 wherein the processor is further programmed to apply one or more mitigation techniques to the dataset based on one or more mitigating measures defined in a configuration file or selected from the identified mitigating measures.

7. The system of claim 6 wherein the mitigation techniques include at least one of deletion, multiplication, redaction suppression, and fuzzing, generalization, noise addition, aggregation and masking.

8. The system of claim 1, wherein the processor is further programmed to: determine whether each of the records in a dataset is unique in its entirety or with regards to subsets of columns that comprise the record; compare entire records and subsets of columns from at least two input datasets to determine the level of similarity in terms of data reproduction or overlap that exists; measure statistical characteristics that capture information about input datasets, the captured information used to determine the level of re-identification risk the input datasets contain; and a quantify contextual factors via weighting and producing a single context-centric score.

9. The system of claim 8 wherein the processor is further programmed to use an optimization to identify subsets of columns that have high resolving power relative to a data subject.

10. The system of claim 8, wherein the processor is further programmed to compose one or more output scores into a single privacy-risk score.

11. The system of claim 1, wherein the processor is further programmed to compute at least one privacy-risk score and produces a risk report by accounting for contextual factors and data-centric features in the input dataset.

12. The system of claim 1, wherein the processor is further programmed to compute scores for at least one of a synthetic dataset, an anonymized dataset, a raw dataset, and a row-level datasets.

13. The system of claim 1 wherein the IO interface outputs the risk output for at least one input dataset.

14. The system of claim 1 wherein the system minimizes overt re-identification risks.

15. The system of claim 14 wherein the re-identification risks include potential risks specified in a configuration file.

16. The system of claim 1, wherein the one or more column level measurements include multi-dimensional attribute analysis based on combinations of columns within the subsampled dataset, and wherein the processor is further programmed to:

evaluate correlations between quasi-identifiers and identifier columns to determine uniqueness scores that quantify how strongly the quasi-identifiers are correlated with identifiers in the dataset and indicate a likelihood of re-identification of records in the dataset.

17. The system of claim 1, wherein the processor is further programmed to:

determine whether the computed privacy risk satisfies a threshold;

based on the privacy risk not satisfying the threshold, generate one or more mitigation recommendations; and iteratively re-compute the privacy risk after applying the one or more mitigation recommendations.

18. The system of claim 1, wherein the processor is further programmed to:

perform an optimization process to limit evaluation of combinations of columns in the column level measurements based on a search technique selected from a hill-climbing algorithm, genetic algorithm, gradient descent, or simulated annealing.

19. A computer-implemented method for estimating privacy risk measures, the method comprising:

accessing, via an input-output (IO) interface, at least one input dataset on which a measurement of privacy risk is to be performed;

determining, by a processor, a size of at least one dataset from among the at least one input dataset;

based on determining that the size of the at least one dataset is larger than a threshold, computing a statistically representative sample size, subsampling the at least one dataset based on the statistically representative sample size, and estimating a privacy risk based on the subsampled dataset;

performing one or more column level measurements on the subsampled dataset and one or more row level measurements on the at least one dataset;

computing a privacy risk based on the column level measurements on the subsampled dataset and the row level measurements on the at least one dataset; and outputting, via the IO interface, the privacy risk based on the column level and row level measurements.

20. A system for estimating privacy risk measures, the system comprising:

an input-output (IO) interface programmed to access at least one input dataset, on at least one of which a measurement of the risk is to be performed;

a processor programmed to:

determine the size of at least one dataset from among the at least one input dataset;

based on the size of the at least one dataset being larger than a threshold, compute a statistically representative sample size, subsample the at least one dataset based on the representative sample size, and estimate a privacy risk based on the subsampled dataset; and perform one or more column level measurements on the subsampled dataset and one or more row level measurements on the at least one dataset;

compute a privacy risk based on the column level measurements on the subsampled dataset and the row level measurements on the at least one dataset, wherein based on the column level and row level measurements, the IO interface outputs a privacy risk;

identify one or more mitigating measures to reduce the privacy risk by taking into account one or more factors that are contributing to higher risk; and apply one or more mitigation techniques to the dataset based on a mitigating measure defined in a configuration file or selected from the identified mitigating measures.

* * * * *